United States Patent
Kim

(10) Patent No.: US 9,407,949 B2
(45) Date of Patent: Aug. 2, 2016

(54) DEVICE AND SIGNAL PROCESSING METHOD THEREOF

(75) Inventor: Byoung-chul Kim, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 519 days.

(21) Appl. No.: 13/462,415

(22) Filed: May 2, 2012

(65) Prior Publication Data

US 2012/0326850 A1 Dec. 27, 2012

(30) Foreign Application Priority Data

Jun. 23, 2011 (KR) ........................ 10-2011-0061306

(51) Int. Cl.
| | |
|---|---|
| *G05B 11/01* | (2006.01) |
| *H04N 21/422* | (2011.01) |
| *G08C 23/04* | (2006.01) |

(52) U.S. Cl.
CPC .......... *H04N 21/42204* (2013.01); *G08C 23/04* (2013.01); *H04N 21/42215* (2013.01)

(58) Field of Classification Search
CPC ................. G05B 11/01; H04N 21/422; H04N 21/42215; H04N 21/42204; G08C 23/04
USPC ....................... 340/12.22; 341/176
See application file for complete search history.

(56) References Cited

U.S. PATENT DOCUMENTS

| | | | |
|---|---|---|---|
| 4,856,081 A * | 8/1989 | Smith | .................. 455/151.4 |
| 6,509,845 B1 | 1/2003 | Tanaka | |
| 6,791,478 B2 | 9/2004 | Lo | |
| 6,912,605 B1 | 6/2005 | Wright | |
| 7,088,788 B2 | 8/2006 | Yen et al. | |
| 8,108,529 B1 | 1/2012 | Wright | |
| 8,896,411 B2 | 11/2014 | Oguchi et al. | |
| 2003/0197624 A1 | 10/2003 | Bresin | |

OTHER PUBLICATIONS

Communication, dated Oct. 9, 2012, issued by the European Patent Office in counterpart European Application No. 12161884.7.
Rudrappa, K.M. et al.: "Implementing RC5 protocol for remote control applications", 2009 International Conference on Control, Automation, Communication and Energy Conservation (INCACEC), Jun. 4-6, 2009, Perundurai, Tamilnadu, India, IEEE, Piscataway, NJ, USA, Jun. 4, 2009, pp. 1-6, XP031512490, ISBN: 978-1-4244-4789-3.

(Continued)

*Primary Examiner* — Edwin Holloway, III
(74) *Attorney, Agent, or Firm* — Sughrue Mion, PLLC

(57) ABSTRACT

A device capable of being controlled by user commands transmitted from a remote control apparatus is disclosed. The device includes a signal receiving unit configured to continuously receive a plurality of same remote control signals from the remote controller which are each generated according to a manipulation of the remote controller for a predetermined unit time; and a control unit configured to perform a first control action corresponding to one remote control signal of the plurality of same remote control signals and neglect other remote control signals of the plurality of remote control signals, if the one of the plurality of same remote control signals is received, wherein if a subsequent remote control signal generated according to an additional manipulation of the remote controller within the predetermined unit time is received, the control unit is configured to perform a second control action corresponding to the received subsequent remote control signal.

19 Claims, 15 Drawing Sheets

(56) References Cited

OTHER PUBLICATIONS r-step the standard engineering protocol Data Sheet, IR Transmission protocol for Remote control, Audio Systems (CD, TAPE, DVD, . . . ), Video Systems (TV, VCR, SAT, STB, . . . ), Projectors, Version 1.0, Aug. 24, 2006.

Communication dated Aug. 19, 2015 issued by European Patent Office in counterpart European Application No. 12 161 884.7.

Communication issued Mar. 3, 2016, issued by the European Patent Office in counterpart European Patent Application No. 12161844.7.

* cited by examiner

| KEY PRESS TIME | TOTAL NUMBER OF TRANSMITTED FRAMES | NUMBER OF ACCEPTED FRAMES | |
|---|---|---|---|
| | | EXEMPLARY EMBODIMENT | RELATED ART |
| 1 SECOND | 10 | 8 | 4 |
| 2 SECONDS | 20 | 18 | 7 |
| 3 SECONDS | 30 | 28 | 11 |
| 4 SECONDS | 40 | 38 | 14 |
| 5 SECONDS | 50 | 48 | 18 |

FIG. 7C

| key press time | NUMBER KEY PRESSES | NUMBER OF ACCEPTED FRAMES | |
| --- | --- | --- | --- |
| | | EXEMPLARY EMBODIMENT | RELATED ART |
| 1SECOND | 8 | 8 | 4 |
| 2SECONDS | 15 | 15 | 7 |
| 3SECONDS | 22 | 22 | 10 |
| 4SECONDS | 29 | 29 | 14 |
| 5SECONDS | 36 | 36 | 17 |

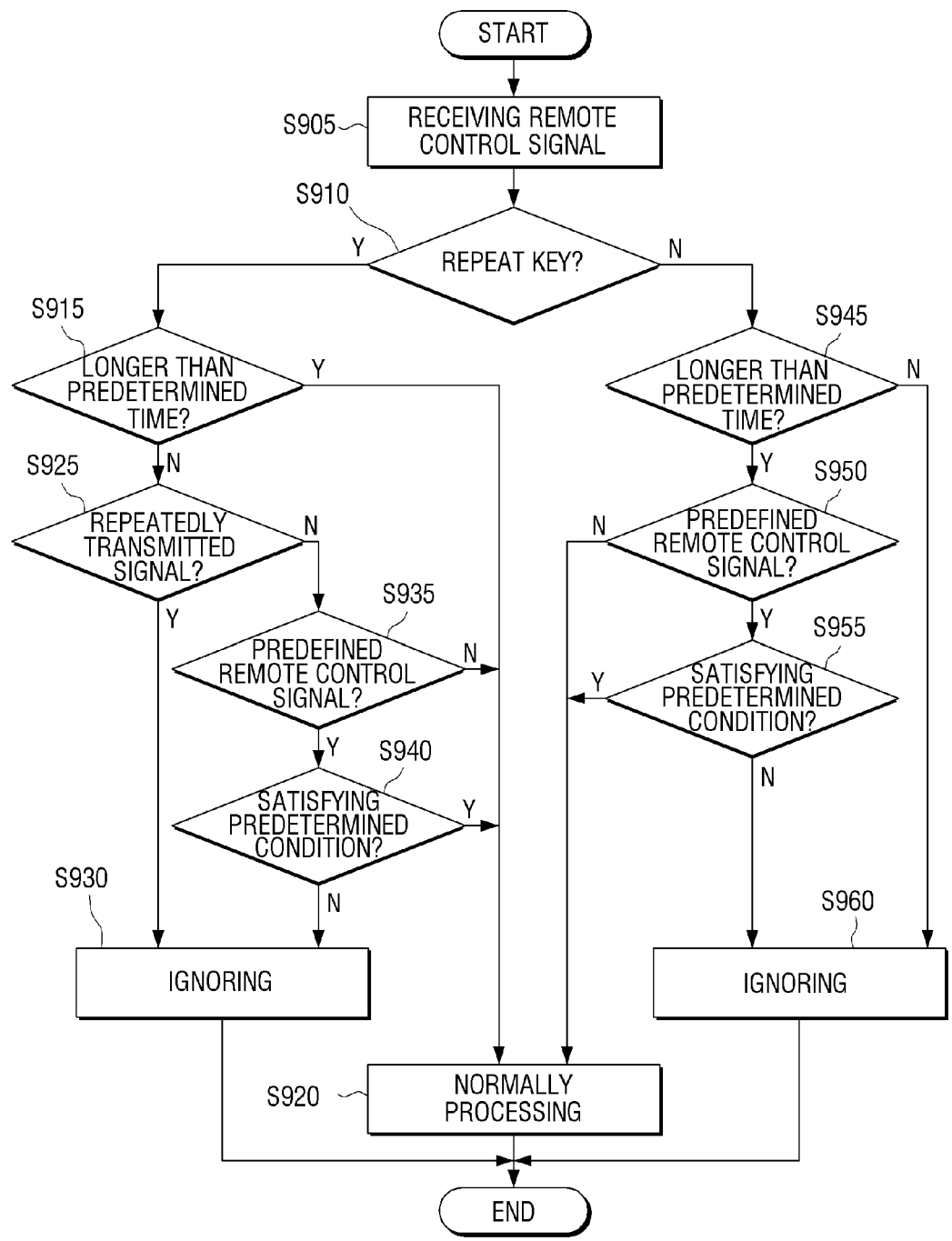

DEVICE AND SIGNAL PROCESSING METHOD THEREOF

CROSS-REFERENCE TO RELATED APPLICATIONS

This application claims priority from Korean Patent Application No. 10-2011-0061306, filed Jun. 23, 2011, in the Korean Intellectual Property Office, the disclosure of which is incorporated herein by reference in its entirety.

BACKGROUND

1. Field

Apparatuses and methods consistent with the present inventive concept relate to a device and a signal processing method thereof, and more particularly, to a device for receiving a remote control signal and a signal processing method thereof.

2. Description of the Related Art

In recent times, a Ruwido standard engineering protocol (r-step protocol) has become widely used in controlling a device.

According to the r-step protocol, for strokes to normal keys, three IR frames are transmitted within 300 ms and then frame transmission is stopped, and for strokes to repeat keys, such as a channel up/down key, a volume up/down key and the like, frames are continuously transmitted until the user's strokes to the repeat keys are released.

On the other hand, as a method for processing remote control signals transmitted according to the r-step protocol, a 300 ms filtering method is utilized.

The 300 ms filtering method, which filters a plurality of same remote control signals transmitted according to the r-step protocol by 300 ms unit, may present a problem in that it does not process remote control signals corresponding to fast keystrokes of a user.

Further, since the r-step protocol does not separately define to the repeat keys, it may present a problem in that actions of the repeat keys are not properly guaranteed.

SUMMARY

Exemplary embodiments may overcome the above disadvantages and other disadvantages not described above. However, exemplary embodiments are not required to overcome the disadvantages described above, and may not overcome any of the problems described above.

According to an aspect of an exemplary embodiment, there is provided a device capable of being controlled by user commands transmitted from a remote controller, the device including: a signal receiving unit configured to continuously receive a plurality of same remote control signals from the remote controller which are each generated according to a manipulation of the remote controller for a predetermined unit time; and a control unit configured to perform a first control action corresponding to one remote control signal of the plurality of same remote control signals and neglect other remote control signals of the plurality of remote control signals, if the one of the plurality of same remote control signals is received, wherein if a subsequent remote control signal generated according to an additional manipulation of the remote controller within the predetermined unit time is received, the control unit is configured to perform a second control action corresponding to the received subsequent remote control signal.

The control unit may ignore remote control signals received within a predetermined critical time from a time when the one of the plurality of same remote control signals is received, and may accept remote control signals received after the predetermined critical time.

If the plurality of same remote control signals is continuously received according to a long push manipulation of a repeat key of the remote controller for a plurality of continuous unit times, the control unit may perform the first control action corresponding to a first received remote control signal and may ignore the other remote control signals for a first unit time and may perform control actions corresponding to each of the other remote control signals for respective remaining unit times.

If the plurality of same remote control signals is continuously received according to a long push manipulation of a repeat key of the remote controller for a plurality of continuous unit times, the control unit may perform the first control action corresponding to a first received remote control signal and may ignore the other remote control signals for a first unit time and may perform control actions corresponding to at least two remote control signals selected from the other remote control signals for respective remaining unit times.

The unit time may be 300 ms from a point of time of the manipulation of the remote controller, and the plurality of same remote control signals may include a first remote control signal generated according to the manipulation of the remote controller and two same remote control signals generated within 100 ms of the first remote control signal.

A time difference between when the plurality of remote control signals is generated according to the manipulation of the remote controller and the subsequent remote control signal is generated according to the additional manipulation of the remote controller may be larger than the predetermined critical time.

According to an aspect of an exemplary embodiment, there is provided a signal processing method of a device capable of being controlled by user commands transmitted from a remote controller, the method including: continuously receiving a plurality of same remote control signals generated according to a manipulation of the remote controller for a predetermined unit time; controlling to perform a control action corresponding to one of the plurality of same remote control signals if the one of the plurality of same remote control signal is received, and neglecting other remote control signals of the plurality of same remote control signals; and if a subsequent remote control signal generated according to an additional manipulation of the remote controller within the predetermined unit time is received, controlling to perform a control action corresponding to the received subsequent remote control signal.

The controlling may include ignoring remote control signals received within a predetermined critical time from a point of time when the one of the plurality of same remote control signals is received and recognizing remote control signals received after the predetermined critical time.

If the plurality of same remote control signals is continuously received according to a long push manipulation of a repeat key of the remote controller for a plurality of continuous unit times, the performing of the control action may be performed corresponding to a first accepted remote control signal and the neglecting may include ignoring the other remote control signals for a first unit time and the performing may further include performing control actions corresponding to each of the other remote control signals for respective remaining unit times.

If the plurality of same remote control signals is continuously received according to a long push manipulation of a repeat key of the remote controller for a plurality of continuous unit times, the performing of the control action may be performed corresponding to a first accepted remote control signal and the neglecting may include ignoring the other remote control signals for a first unit time and the performing may further include performing control actions corresponding to at least two remote control signals selected from the other remote control signals for respective remaining unit times.

The unit time may be 300 ms from a point of time of the manipulation of the remote controller, and the plurality of same remote control signals may include a first remote control signal generated according to the manipulation of the remote controller and two same remote control signals generated within 100 ms of the first remote control signal.

A time difference between when the plurality of same remote control signals is generated according to the manipulation of the remote controller and the subsequent remote control signal is generated according to the additional manipulation of the remote controller may be larger than the predetermined critical time.

According to an aspect of an exemplary embodiment, there is provided a recording medium in which a program for carrying out a signal processing method of a device capable of being controlled by user commands transmitted from a remote controller is stored, the signal processing method including: continuously receiving a plurality of same remote control signals generated according to a manipulation of the remote controller for a predetermined time; controlling to perform a control action corresponding to one of the plurality of same remote control signals if the one of the plurality of same remote control signal is received, and neglecting other remote control signals of the plurality of same remote control signals; and if a subsequent remote control signal generated according to an additional manipulation of the remote controller within the predetermined time is received, controlling to perform a control action corresponding to the received subsequent remote control signal.

The controlling may include ignoring remote control signals received within a predetermined critical time from a point of time when the one of the plurality of same remote control signals is received and accepting remote control signals received after the predetermined critical time.

If the plurality of same remote control signals is continuously received according to a long push manipulation of a repeat key of the remote controller for a plurality of continuous unit times, the performing of the control action may be performed corresponding to a first accepted remote control signal and the neglecting may include ignoring the other remote control signals for a first unit time and the performing may further include performing control actions corresponding to each of the other remote control signals for respective remaining unit times.

BRIEF DESCRIPTION OF THE DRAWINGS

The above and/or other aspects of the exemplary embodiments will become more apparent by describing certain exemplary embodiments with reference to the accompanying drawings, in which:

FIGS. 6A to 6C are views for comparing and explaining signal processing methods according to manipulations of repeat keys in a related art and an exemplary embodiment;

FIGS. 7A to 7C are views for comparing and explaining signal processing methods according to fast keystrokes of a user in a related art and another exemplary embodiment;

FIG. 9 is a flowchart for explaining a signal processing method according to another exemplary embodiment.

DETAILED DESCRIPTION OF EXEMPLARY EMBODIMENTS

Exemplary embodiments are described in greater detail below with reference to the accompanying drawings.

Figure 1:
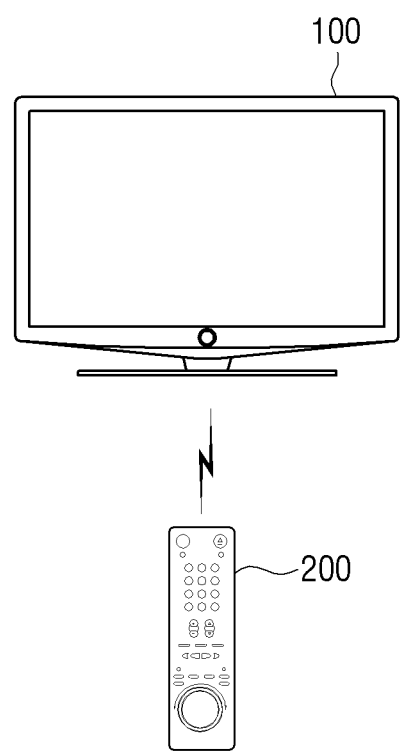
FIG. 1 is a view schematically showing a remote control system according to an exemplary embodiment.

FIG. 1 is a view schematically showing a remote control system according to an exemplary embodiment.

As shown in FIG. 1, the remote control system according to the exemplary embodiment includes a device 100 and a remote control apparatus 200.

The device 100 is controlled by control signals, that is, remote control signals, which are received from the remote control apparatus 200. The device 100 may be embodied by a television (TV), a personal computer (PC), a set-top box, a digital broadcasting system, an audio system, a video system, a home device, etc, but the present inventive concept is not limited thereto and it may be applied to all apparatuses capable of being controlled by user commands transmitted from the remote control apparatus 200. In the following description, however, to make explanations easier, the device 100 will be explained as, for example, a case where it is embodied by a display apparatus, such as a TV.

The remote control apparatus 200 functions to receive user commands for controlling operations of the device 100 and to transmit them to the device 100. Here, the remote control apparatus 200 may be embodied by a remote controller, a smart phone having a control mode, and so on. Hereinafter, the remote control apparatus 200 will be assumed and explained that it is embodied by the remote controller which may include a smart phone.

The remote controller 200 may be provided with repeat keys, such as a channel up/down key, a volume up/down key, a direction conversion key and the like, and normal keys, such as a number or figure key, a power key, a menu key and the like, and be embodied to transmit IR signals according to keystrokes under a predetermined protocol. Here, the predetermined protocol may have characteristics in order to divide the keystrokes into keystrokes of the repeat keys and keystrokes of the normal keys and to transmit IR signals according to the divided keystrokes.

For instance, the remote controller 200 may transmit the IR signals according to the user's strokes of the keys provided therein under a Ruwido standard engineering protocol (r-step protocol of Ruwido). Here, the r-step protocol may be embodied so as to transmit three IR frames on a 100 ms time basis, within 300 ms, and then stop the frame transmission for the user's strokes to the normal keys and to continuously transmit IR frames on a 100 ms time basis until the user's strokes of the repeat keys are released, for the user's strokes to the repeat keys.

Figure 2A:
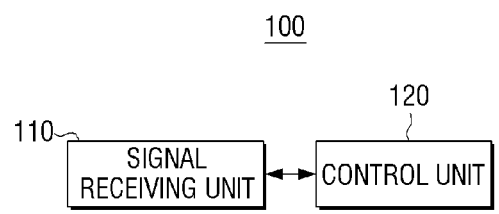
FIG. 2A is a block diagram showing a configuration of a device according to an exemplary embodiment.

FIG. 2A is a block diagram for explaining a configuration of the device 100 according to an exemplary embodiment. Referring to FIG. 2A, the device 100 includes a signal receiving unit 110 and a control unit 120. The term "unit" as used herein means a hardware component, such as a processor or circuit, and/or a software component that is executed by a hardware component such as a processor.

The signal receiving unit 110 functions to receive control commands according the keystrokes from the remote controller 200. In other words, the signal receiving unit 110 receives remote controller's signals, that is, remote control signals, generated at the remote controller 200 and transmits them to the control unit 120, thereby allowing the device 100 to perform a function action corresponding thereto.

Particularly, the signal receiving unit 110 may continuously receive a plurality of same remote control signals generated according to an once manipulation of the remote controller for a predetermined unit time. As used herein, the term "unit time" refers to a time from a point of time when the remote controller is manipulated. For instance, the plurality of same remote control signals may include a first remote control signal generated according to the manipulation of the remote controller 200 and two same remote control signals generated by 100 ms from the first remote control signal. Further, the predetermined unit time may be 300 ms from a point of time when the remote controller is manipulated. In other words, the signal receiving unit 110 receives three remote control signals generated by 100 ms for the unit time of 300 ms, according to the once manipulation of the keys provided in the remote controller. However, in certain exceptional circumstances, such as a case where remote control signals are not received due to an obstacle and the like, are not to be considered since the device cannot received the remote control signals from the remote controller.

On the other hand, the type of received signals may be varied according to whether the keys manipulated at the remote controller 200 are the normal keys or the repeat keys, but detailed explanations thereon will be described later.

The control unit 120 controls a general operation for all sorts of components included in the device 100. In other words, according to the remote control signals received at the signal receiving unit 110, the control unit 120 controls all sorts of components included in the display apparatus 100 to allow the display apparatus 100 to perform actions corresponding to the remote controller signals.

Particularly, when one of the plurality of same remote control signals is accepted, the control unit 120 may perform a control action corresponding to the accepted remote control signal once and neglect the rest of the plurality of same remote control signals.

Further, when a subsequent remote control signal generated according to an additional manipulation of the remote controller 200 within a unit time is received, the control unit 120 may perform a control action corresponding to the received subsequent remote control signal. Here, the subsequent remote control signal may not be signals repeatedly received within the predetermined unit time (for example, 300 ms) by the predetermined protocol as described above, but remote control signals generated according to a fast additional manipulation of a user within the predetermined unit time.

Furthermore, the control unit 120 may neglect remote control signals received within a predetermined critical time from a point of time when the one of the plurality of same remote control signals is accepted and accept remote control signals received after the predetermined critical time. Here, the remote control signals received within the predetermined critical time may be remote control signals repeatedly received by the predetermined protocol and the remote control signals received after the predetermined critical time may be remote control signals generated by the additional manipulation of a user.

Moreover, when a plurality of same remote control signals is continuously received according to a long push manipulation of the repeat keys of the remote controller for a plurality of continuous unit times in accordance with an exemplary embodiment, the control unit 120 may perform a control action corresponding to a first accepted remote control signal while ignoring remote control signals other than the first accepted remote control signal for a first unit time and perform control actions corresponding to each of entire remote control signals for respective remaining unit times. As used herein, the term "long push manipulation" refers to when keys of the remote controller are pushed by a user for a plurality of continuous unit times such that a plurality of same remote control signals is continuously transmitted from the remote controller.

Also, when a plurality of same remote control signals is continuously received according to a long push manipulation of the repeat keys of the remote controller for a plurality of continuous unit times in accordance with another exemplary embodiment, the control unit 120 may perform a control action corresponding to a first accepted remote control signal while ignoring remote control signals other than the first accepted remote control signal for a first unit time and perform control actions corresponding to at least two remote control signals selected from remote control signals in corresponding unit time for respective remaining unit times. In other words, if the control unit accepts and processes the entire remote control signals for the remaining unit times, it has a burden of processing the entire remote control signals received by 100 ms. Accordingly, to avoid this, the control unit may be embodied to process the remote control signals received by 200 ms.

Hereinafter, the device 100 will be explained as, for example, a case where it is embodied by a display apparatus 100', such as a TV.

Figure 2B:
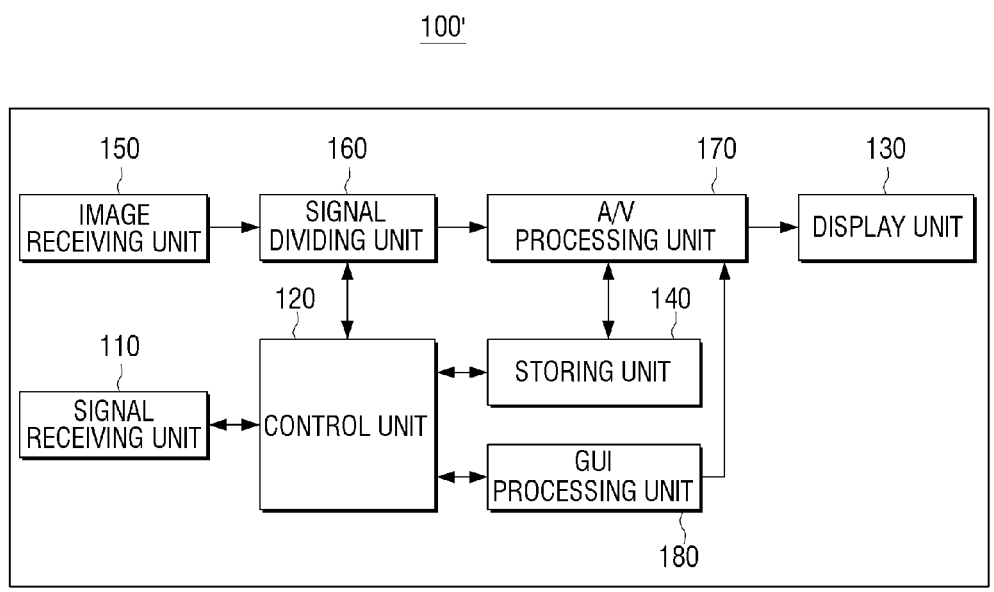
FIG. 2B is a block diagram for explaining a detailed configuration of a display apparatus according to an exemplary embodiment.

FIG. 2B is a block diagram for explaining a detailed configuration of the display apparatus 100' according to an exemplary embodiment.

Referring to FIG. 2B, the display apparatus 100 includes a signal receiving unit 110, a control unit 120, a display unit 130, a storing unit 140, an image receiving unit 150, a signal dividing unit 160, an audio visual (A/V) processing unit 170 and a graphical user interface (GUI) processing unit 180. In the following description, detailed explanations on components overlapping with those of FIG. 2A will be omitted.

The image receiving unit 150 receives a broadcast by wire or radio from a broadcasting station or a satellite and demodulates it. To be specific, the image receiving unit 150 may be embodied by at least one tuner. In some cases, the image receiving unit 150 may have a plurality of tuners to simultaneously receive broadcasts through a plurality of channels.

The signal dividing unit 160 divides a broadcasting signal into a video signal, an audio signal and broadcasting information. And the signal dividing unit 160 transmits the video signal and the audio signal to the A/V processing unit 170, and transmits the broadcasting information to the storing unit 140, the control unit 120 and the GUI processing unit 180.

The A/V processing unit 170 performs a signal processing, such as a video decoding, a video scaling, an audio decoding and the like, to the video signal and the audio signal inputted from the signal dividing unit 160. In addition, the A/V processing unit 170 outputs the video signal and the audio signal to the display unit 130 and an audio output unit (not shown), respectively.

To the contrary, if storing the video signal and the audio signal in the storing unit 140 or transmitting them to an external appliance through a connecting unit (not shown), the A/V processing unit 170 outputs the video signal and the audio signal in a compressed state to the storing unit 140 or the connecting unit (not shown).

The GUI processing unit 180 creates a GUI to be displayed on a screen, and adds the created GUI on an image outputted from the A/V processing unit 170.

The display unit 130 may display the image outputted from the A/V processing unit 170.

The signal receiving unit 110 functions to receive control commands according to the keystrokes transmitted from the remote controller 200. In other words, the signal receiving unit 110 receives the remote control signals generated at the remote controller 200 and transmits them to the control unit 120, thereby allowing the display apparatus 100' to perform out a function action corresponding thereto.

For instance, if there exists any manipulation of the repeat key, such as the channel up/down key, the volume up/down key, the direction conversion key and the like, the signal receiving unit 110 may continuously receive a plurality of same remote control signals for a predetermined unit time, according to the manipulation of the corresponding keys. If there exists an once manipulation of the normal key, for example, a number '9' key, provided in the remote controller 200, the signal receiving unit 110 receives three remote control signals generated by 100 ms for a unit time of 300 ms.

Also, if there exists an once manipulation of the repeat key, for example, a channel up key, the signal receiving unit 110 receives a plurality of remote control signals generated by 100 ms until the manipulation is released.

On the basis of a user commands inputted through the signal receiving unit 110 or an input unit (not shown), the control unit 120 controls all sorts of components included in the display apparatus 100' to perform actions corresponding thereto.

Particularly, when one of the plurality of same remote control signals is accepted, the control unit 120 may perform a control action corresponding to the accepted remote control signal once and neglect the rest of the plurality of same remote control signals.

To be specific, when one of the plurality of same remote control signals transmitted within a unit time is accepted, the control unit 120 may perform a control action corresponding to the accepted remote control signal once and neglect the rest of the plurality of same remote control signals in the unit time, and perform the same actions also within other unit times.

Further, when a subsequent remote control signal generated according to an additional manipulation of the remote controller 200 within the unit time is received, the control unit 120 may perform a control action corresponding to the received subsequent remote control signal.

To be specific, the control unit 120 may neglect remote control signals received within a predetermined critical time from a point of time when the one of the plurality of same remote control signals is accepted and accept remote control signals received after the predetermined critical time.

For instance, if after a manipulation of the channel up key is executed, an additional manipulation of the channel up key is executed within a unit time of 300 ms, the control unit 120 may not neglect it, but perform a control action corresponding thereto. In other words, since remote control signals received within a time of 100 ms+A after the operation to the channel up key is executed can be seen as remote control signals repeatedly received by the predetermined protocol, they may be ignored, whereas since remote control signals received after the time of 100 ms+A can be seen as remote control signals generated by the additional manipulation of the channel up key, they may be accepted and normally processed. Here, 'A' may be a time required to accept and process the signals.

Moreover, when a plurality of same remote control signals is continuously received according to a long push manipulation of the repeat keys of the remote controller for a plurality of continuous unit times in accordance with the exemplary embodiment, the control unit 120 may perform a control action corresponding to a first accepted remote control signal while ignoring remote control signals other than the first accepted remote control signal for a first unit time and perform control actions corresponding to each of entire remote control signals for respective remaining unit times.

For instance, if a plurality of same remote control signals is continuously received three each of time intervals of 100 ms according to a long push manipulation of the channel up key of the remote controller for a plurality of continuous unit times (for example, each 300 ms), the control unit 120 may perform a control action corresponding to a first accepted remote control signal while ignoring remote control signals other than the first accepted remote control signal for a first unit time of 300 ms and perform control actions corresponding to each of the three remote control signals for the respective remaining unit times of 300 ms.

Also, when a plurality of same remote control signals is continuously received according to a long push manipulation of the repeat keys of the remote controller for a plurality of continuous unit times in accordance with the another exemplary embodiment, the control unit 120 may perform a control action corresponding to a first accepted remote control signal while ignoring remote control signals other than the first accepted remote control signal for a first unit time and perform control actions corresponding to at least two remote control signals selected from remote control signals in corresponding unit time for respective remaining unit times.

For instance, if a plurality of same remote control signals is continuously received three each of time intervals of 100 ms according to the long push manipulation of the channel up key of the remote controller for a plurality of continuous unit times (for example, each 300 ms), the control unit 120 may perform a control action corresponding to a first accepted remote control signal while ignoring the remote control signals other than the first accepted remote control signal for a first unit time of 300 ms, and perform normal processing to remote control signals received by unit time of 200 ms and neglect remote control signals received therebetween for the respective remaining unit times of 300 ms.

The storing unit 140 may store information on the remote control signals received from the remote controller 200, predetermined time information required to process the remote control signals, and so on.

Figure 3:
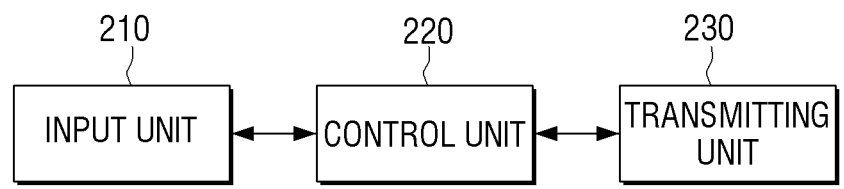
FIG. 3 is a block diagram showing a configuration of a remote controller according to an exemplary embodiment.

FIG. 3 is a block diagram showing a configuration of the remote controller 200 according to an exemplary embodiment. Referring to FIG. 3, the remote controller 200 includes an input unit 210, a control unit 220, and a transmitting unit 230.

The input unit 210 allows the user to input user commands capable of controlling the device 100 or 100' therein.

To be specific, the input unit 210 may be embodied by a plurality of manipulation buttons including the repeat keys, such as the channel up/down key, the volume up/down key, the direction conversion key and the like, and the normal keys, such as the number or figure key, the power key, the menu key and the like.

The control unit 220 may control the transmitting unit 230 to convert the user commands inputted from the input unit 210 into an infrared (IR) frame form and to transmit them to the device 100 or 100'.

To be specific, for strokes to the normal keys, the control unit 220 may control to transmit a plurality of IR frames at predetermined time intervals within a predetermined unit time and then stop transmitting the frames. For instance, the control unit 220 may control to transmit three IR frames at time intervals of 100 ms and then stop transmitting the frames.

Further, for strokes to the repeat keys, the control unit 220 may control to continuously transmit IR frames on a predetermined time basis until the user's strokes to the repeat keys are released. For instance, the control unit 220 may control to continuously transmit the IR frames at time intervals of 100 ms.

The transmitting unit 230 may transmit the user commands inputted through the input unit 210 in the IR frame form to the device 100 or 100' according to the control of the control unit 220.

In this case, the device 100 or 100' may be embodied to receive the IR frames transmitted according to the keystrokes of the remote controller 200 and perform function actions corresponding to relevant function controls.

Figure 4A:
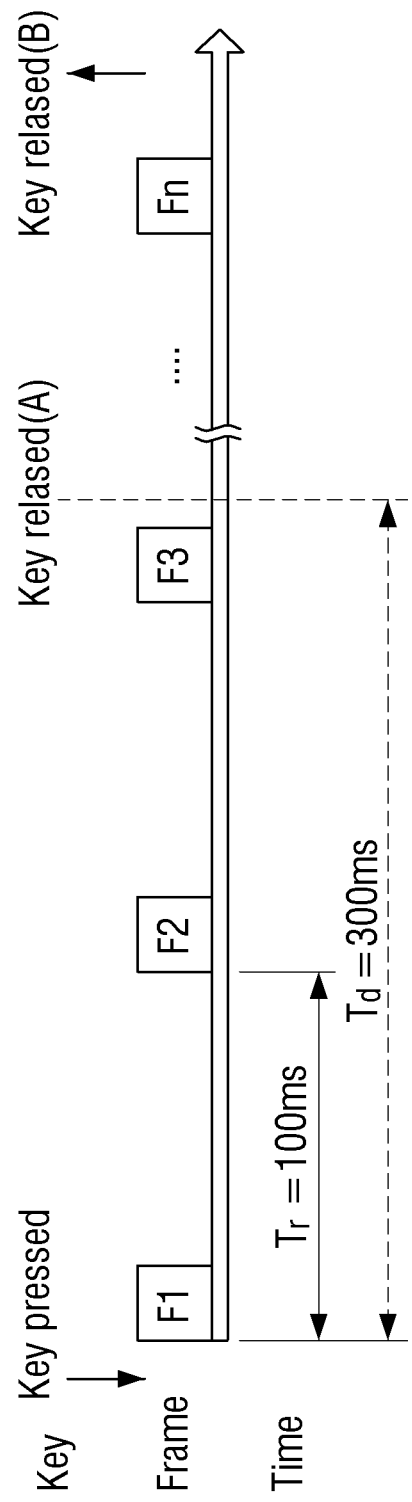
FIGS. 4A and 4B are views for explaining a remote control key transmitting method in the remote controller according to an exemplary embodiment, respectively.
Figure 4B:
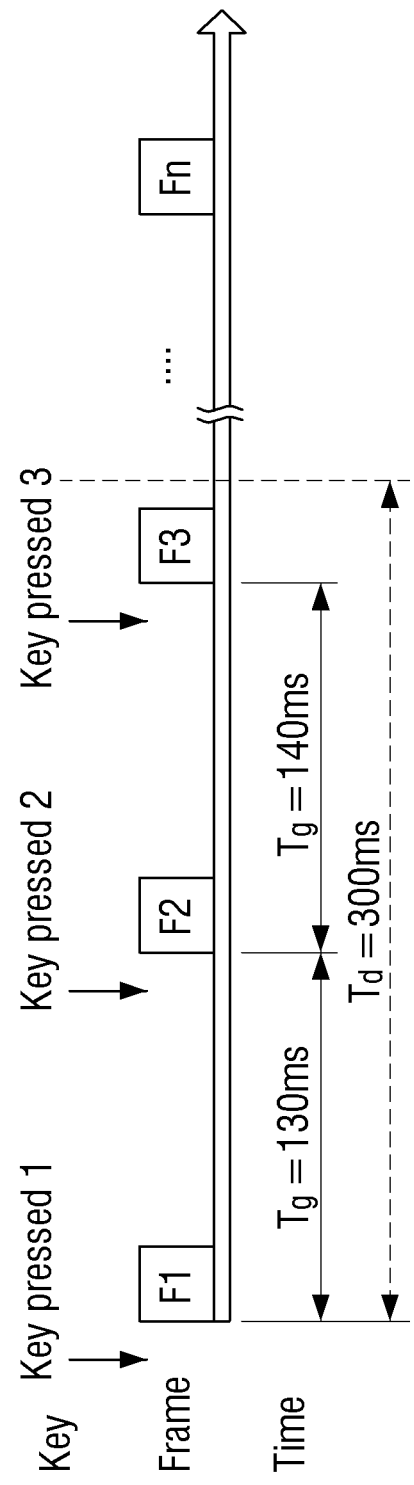

FIGS. 4A and 4B are views for explaining a remote control key transmitting method in the remote controller 200 according to an exemplary embodiment, respectively.

Referring to FIG. 4A, if there exists an once pressed manipulation 'Key pressed' to a certain key provided in the remote controller 200, a plurality of same remote control signals (F1, F1' and F1") may be continuously transmitted on a predetermined time basis (100 ms) within a predetermined unit time (300 ms).

Here, if the certain key or an object key is a normal key, the same remote control signals are transmitted three times (F1, F1' and F1") and then transmitting the frames for the remote control signals is stopped (A).

Also, if the object key is a repeat key, the same remote control signals are continuously transmitted until the user's stroke to the key is released (B).

In addition, referring to FIG. 4B, if there exists a plurality of manipulations 'Key pressed 1, 2 and 3' to certain keys provided in the remote controller 200, IR frames corresponding to relevant key manipulations may be transmitted. In this case, the plurality of pressed manipulations by the user may be for times, such as 130 ms and 140 ms, which exceed 100 ms as explained in FIG. 4A.

Figure 5A:
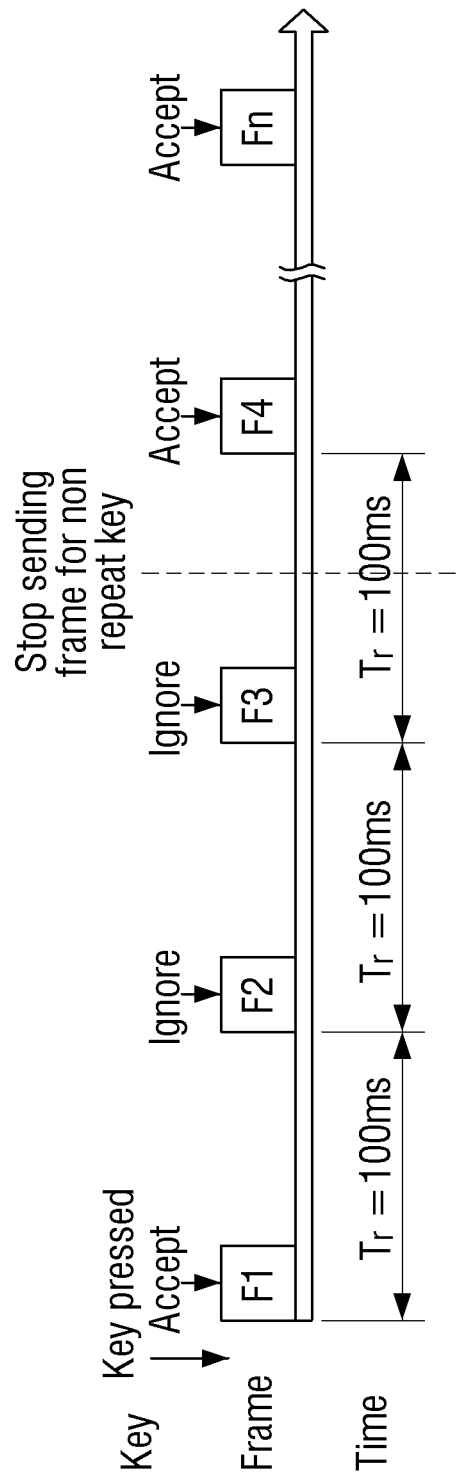
FIGS. 5A and 5B are views for explaining a remote control key signal processing method in the device according to an exemplary embodiment, respectively.
Figure 5B:
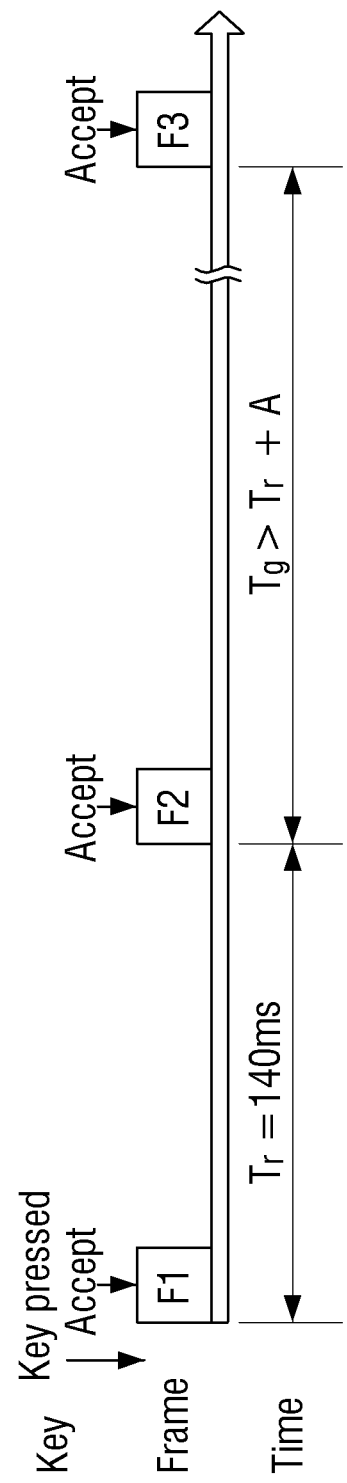

FIGS. 5A and 5B are views for explaining a remote control key signal processing method in the device 100 according to an exemplary embodiment, respectively.

FIG. 5A is a view for explaining a repeat key processing method in the device 100 according to an exemplary embodiment.

Referring to FIG. 5A, when receiving a frame F1, the device 100 accepts it as an effective frame and performs normal processing. After that, when receiving a frame F2, the device 100 calculates a value of received time difference between the frames F1 and F2, and if the calculated value of received time difference is a predetermined critical time Tr, may determine that the frame F2 is not a frame generated by the plurality of manipulations to the object key and ignore the relevant IR frame. In other words, if the value of received time difference between the frames F1 and F2 exceeds the predetermined critical time Tr, the device 100 may determine the frame F2 as the frame transmitted according to the r-step protocol as described above and ignore the relevant frame. When receiving a frame F3, the device 100 operates in the same manner as to the case of frame F2.

An IR frame received thereafter, that is, a frame F4 is not ignored, but accepted and normally processed by the device 100 even if a value of received time difference between the frames F3 and F4 is the predetermined critical time Tr. According to this, actions of the repeat keys are guaranteed.

FIG. 5B is a view for explaining a fast keystroke processing method of the device 100 according to an exemplary embodiment.

Referring to FIG. 5B, if the value of received time difference between the frames F1 and F2 satisfies Mathematical formula 1 (given hereinbelow), the device 100 may accept the frame F2 as a signal according to the key manipulation of a user and perform a normal processing.

$$Tg > Tr + A$$ [Mathematical formula 1]

Here, Tg may be the received time difference between the frames F1 and F2, Tr may be a difference in frame transmission time according to the r-step protocol as described above, and A may be a value considering a processing time required to receive an IR signal, and then allow an IR driver to accept it in an IR frame and decode a key value.

Figure 6A:
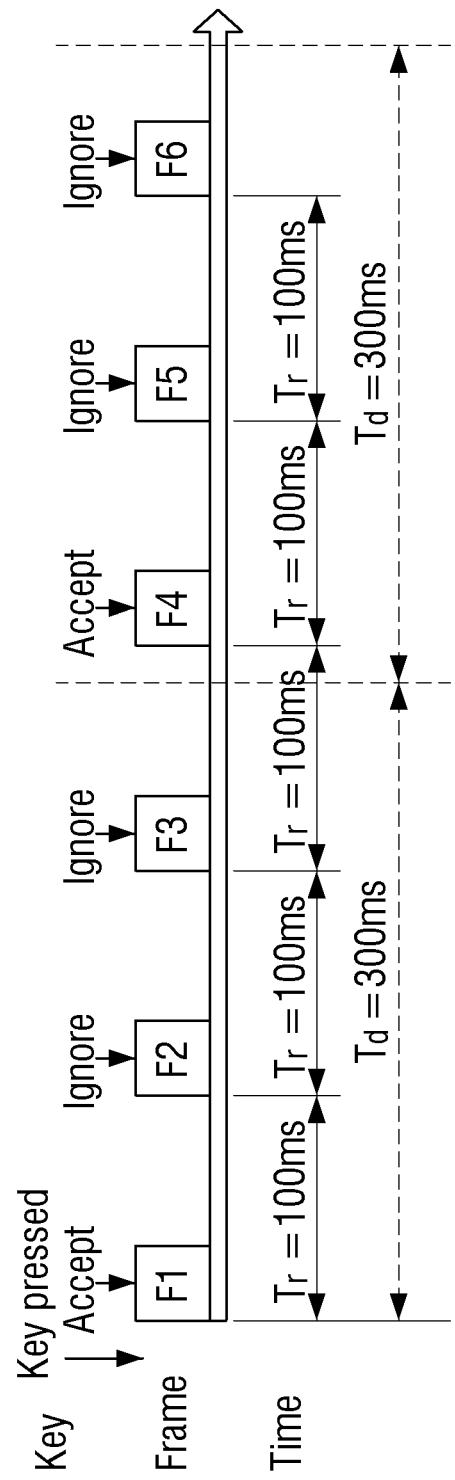
Figure 6B:
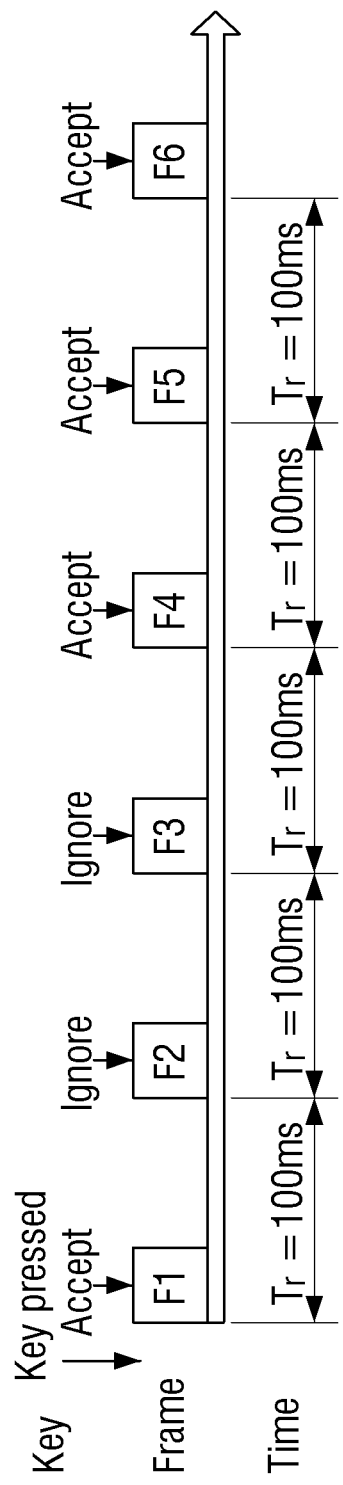

FIGS. 6A to 6C are views for comparing and explaining signal processing methods according to a manipulation of the repeat keys in a related art and an exemplary embodiment.

FIG. 6A is a view showing the signal processing method according to the related art. Referring to FIG. 6A, repeated frame filtering times designated as Td are applied, so that frames F2, F3, F5 and F6 are ignored at the device 100.

FIG. 6B is a view showing the signal processing method according to the exemplary embodiment. Referring to FIG. 6B, at the device 100, only frames F2 and F3 are ignored and frames F5 and F6 are processed normally.

FIG. 6C is a result that the number of IR frames processed while the repeat key is continuously pressed was simulated. It can be found that when the repeat key was continuously pressed for 5 seconds, 48 frames were processed in the exemplary embodiment, whereas 18 frames were processed in the related art. In other words, according to the exemplary embodiment, the frames can be more processed 2.5 times as compared with the related art.

Figure 7A:
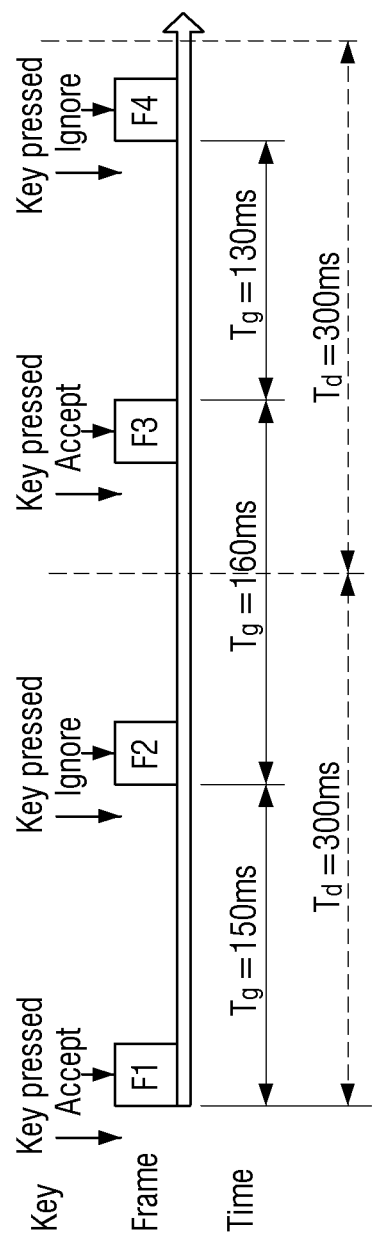
Figure 7B:
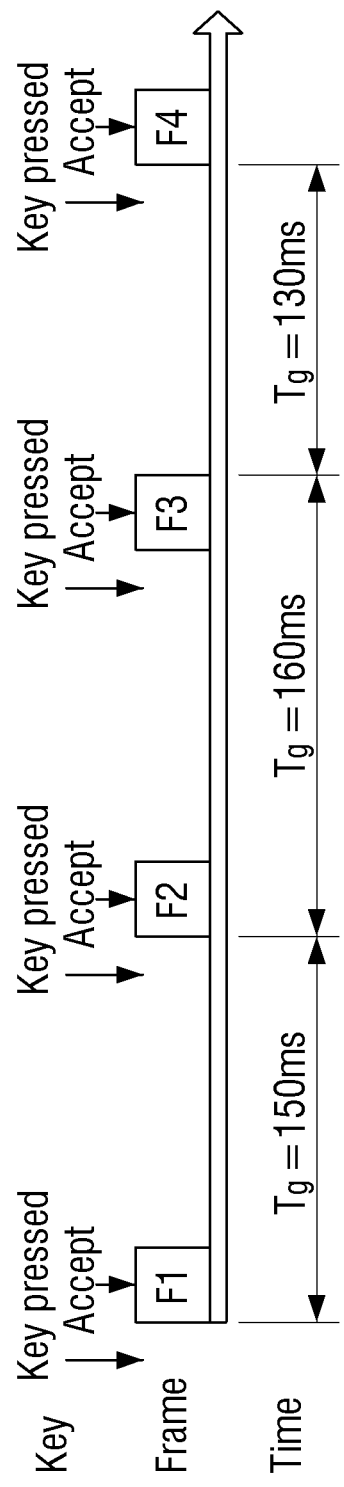

FIGS. 7A to 7C are views for comparing and explaining signal processing methods according to fast keystrokes of a user in a related art and another exemplary embodiment.

FIG. 7A is a view showing the signal processing method according to the related art. Referring to FIG. 7A, all frames F1, F2, F3 and F4 are effective frames according to the fast keystrokes of a user, but in the related art, repeated frame filtering times designated as Td are applied, so that only frames F1 and F3 are processed.

FIG. 7B is a view showing the signal processing method according to another exemplary embodiment. Referring to FIG. 7B, it can be found that all frames F1, F2, F3 and F4 are normally processed.

FIG. 7C is a view showing the number of accepted or processed frames to the number of key presses from 1 second to 5 seconds. It can be found that as to the 36 fast keystrokes for 5 seconds, they all were normally processed at the device 100 in the exemplary embodiment, whereas only 17 fast keystrokes, which are approximately half of them, were processed in the related art.

Figure 8:
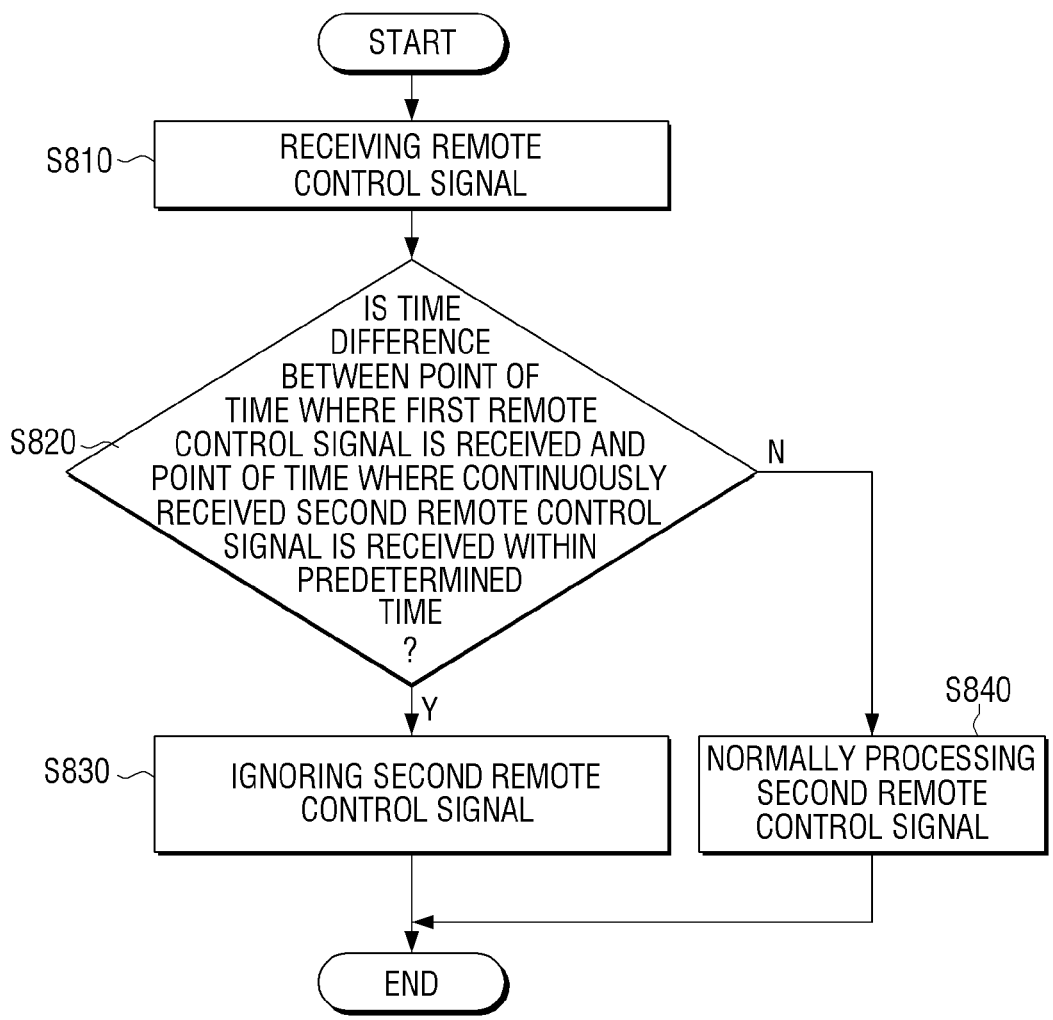
FIG. 8 is a flowchart for explaining a signal processing method according to an exemplary embodiment.

FIG. 8 is a flowchart for explaining a signal processing method according to an exemplary embodiment.

According to the signal processing method of the device shown in FIG. 8, a plurality of same remote control signals generated according to an once manipulation of the remote controller is continuously received for a predetermined unit time (S810). Here, the predetermined unit time may be 300 ms from a point of time when the remote controller is operated. In addition, the plurality of same remote control signals may include a first remote control signal generated according to the manipulation of the remote controller and two same remote control signals generated by 100 ms from the first remote control signal.

Subsequently, when one of the plurality of same remote control signals is accepted, a control action corresponding to the accepted remote control signal is performed once and the rest of the plurality of same remote control signals is ignored. Further, when a subsequent remote control signal generated according to an additional manipulation of the remote controller within the unit time is received, a control action corresponding to the received subsequent remote control signal is performed (S820).

In the step S820, remote control signals received within a predetermined critical time from a point of time when the one of the plurality of same remote control signals is accepted may be ignored and remote control signals received after the predetermined critical time may be accepted.

Further, in the step S820, when a plurality of same remote control signals is continuously received according to a long push manipulation of the repeat keys of the remote controller for a plurality of continuous unit times in accordance with an exemplary embodiment, a control action corresponding to a first accepted remote control signal may be performed while remote control signals other than the first accepted remote control signal are ignored, for a first unit time, and then control actions corresponding to each of the entire plurality of remote control signals may be performed for respective remaining unit times.

Also, in the step S820, when a plurality of same remote control signals is continuously received according to a long push manipulation of the repeat keys of the remote controller for a plurality of continuous unit times in accordance with another exemplary embodiment, a control action corresponding to a first accepted remote control signal may be performed while remote control signals other than the first accepted remote control signal are ignored, for a first unit time and control actions corresponding to at least two remote control signals selected from remote control signals in corresponding unit time may be performed for respective remaining unit times.

FIG. 9 is a flowchart for explaining a signal processing method according to another exemplary embodiment.

According to the signal processing method shown in FIG. 9, when a remote control signal is received (S905), it is determined whether the received remote control signal is a signal generated by the repeat key (S910).

If the received remote control signal is the signal generated by the repeat key (S910: Y), it is determined whether a point of received time is one, which has passed longer than a predetermined time from a point of time when a previous remote control signal is received (S915).

As a result of the determination in the step S915, if the point of received time is one, which has passed longer than the predetermined time (S915: Y), the received remote control signal is normally processed (S920).

As a result of the determination in the step S915, if the point of received time is not one, which has passed longer than the predetermined time (S915: N), it is verified whether the received remote control signal is a repeatedly transmitted signal (S925).

As a result of verification in the step S925, if the received remote control signal is the repeatedly transmitted signal (S925: Y), it is ignored (S930).

As a result of verification in the step S925, if the received remote control signal is not the repeatedly transmitted signal (S925: N), it is verified whether the received remote control signal is a predefined remote control signal defined in the system (S935). For instance, the predefined remote control signal may be a remote control signal received after a first unit time of 300 ms.

As a result of verification in the step S935, if the received remote control signal is the predefined remote control signal (S935: Y), it is checked whether the corresponding signal satisfies a predetermined condition (S940). For instance, it may be checked whether there exists a predetermined condition for the remote control signal received after the first unit time of 300 ms. Here, the predetermined condition may be a condition set to normally process only signals, such as odd number signals or even number signals, which are not all signals. According to this, not all remote control signals received after the first unit time of 300 ms may be processed, but selectively according to the predetermined condition.

As a result of check in the step S940, if the received remote control signal satisfies the predetermined condition (S940: Y), the corresponding signal is normally processed (S920).

Further, As a result of check in the step S940, if the received remote control signal does not satisfy the predetermined condition (S940: N), the corresponding signal is ignored.

On the other hand, as a result of verification in the step S935, if the received remote control signal is not the predefined remote control signal defined in the system (S935: N), the corresponding signal is normally processed (S920).

Further, as a result of the determination in the step S910, if the received remote control signal is not the signal generated by the repeat key (S910: N), it is determined whether a point of received time is one, which has passed longer than a predetermined time from a point of time when a previous remote control signal is received (S945).

As a result of the determination in the step S945, if the point of received time is one, which has passed longer than the predetermined time (S945: Y), it is verified whether the received remote control signal is a predefined remote control signal defined in the system (S950).

As a result of verification in the step S950, if the received remote control signal is not the predefined remote control signal (S950: N), the corresponding signal is normally processed (S960).

Further, as a result of verification in the step S950, if the received remote control signal is the predefined remote control signal (S950: Y), it is checked whether the corresponding signal satisfies a predetermined condition (S955).

As a result of check in the step S955, if the corresponding signal satisfies the predetermined condition (S955: Y), the corresponding signal is normally processed (S920).

Further, As a result of check in the step S955, if the corresponding signal does not satisfy the predetermined condition (S955: N), the corresponding signal is ignored (S960).

On the other hand, as a result of the determination in the step S945, if the point of received time is not one, which has passed longer than the predetermined time (S945: N), the corresponding signal is ignored (S960).

Further, another exemplary embodiment may include a recording medium, that is, a computer-readable recording medium, including a program for executing the signal processing method of the device according to the exemplary embodiment as described above. The computer-readable recording medium includes various recording apparatuses in which data readable by a computer system may be stored. Examples of the computer-readable recording medium include a ROM, a RAM, a CD-ROM, a magnetic tape, a floppy disk, an optical data storing apparatus, etc. Further, computer-readable recording media may be distributed in computer systems connected through a network, so that they can store and execute codes readable by the computer in a distributed method.

According to this, a receiving rate and a responsiveness to the remote control signals may be improved.

As described above, although the present inventive concept has been explained by the above exemplary embodiments, it is not limited thereto. The present teaching can be readily applied to other types of apparatuses and many alternatives, modifications, and variations will be apparent to those skilled in the art.

What is claimed is:

1. A device capable of being controlled by user commands transmitted from a remote controller, the device comprising:
    a signal receiving unit configured to receive a plurality of same remote control signals from the remote controller for a predetermined unit time; and
    a control unit configured to perform a first control action corresponding to a first received remote control signal of the received plurality of same remote control signals for the predetermined unit time,
    wherein if a time difference between points of time where the same remote control signal is received is smaller than a predetermined critical time, the control unit neglects other remote control signals of the received plurality of same remote control signals for the predetermined unit time,
    wherein if the time difference is larger than the predetermined critical time, the control unit performs the control action corresponding to the other remote control signals of the plurality of same remote control signals for the predetermined unit time, and
    wherein the predetermined unit time starts from a point of time where the first received remote control signal is received.

2. The device of claim 1, wherein if the received plurality of same remote control signals is repeatedly received according to a long push manipulation of a repeat key of the remote controller for a plurality of continuous unit times and the time difference is larger than the predetermined critical time, the control unit performs the control action corresponding to the first received remote control signal and ignores the other remote control signals for a first unit time and performs control actions corresponding to each of the other remote control signals for respective remaining unit times.

3. The device of claim 1, wherein if the received plurality of same remote control signals is repeatedly received according to a long push manipulation of a repeat key of the remote controller for a plurality of continuous unit times and the time difference is larger than the predetermined critical time, the control unit performs the control action corresponding to the first received remote control signal and ignores the other remote control signals for a first unit time and performs control actions corresponding to at least two remote control signals selected from the other remote control signals for respective remaining unit times.

4. The device of claim 1,
    wherein the predetermined unit time is 300 ms, and
    wherein if the time difference is larger than the predetermined critical time, the received plurality of same remote control signals comprises the first received remote control signal generated according to a manipulation of the remote controller and two same remote control signals generated sequentially at 100 ms intervals following the manipulation of the remote controller.

5. A signal processing method of a device capable of being controlled by user commands transmitted from a remote controller, the method comprising:
    receiving a plurality of same remote control signals for a predetermined unit time;
    controlling to perform a control action corresponding to a first received remote control signal of the received plurality of same remote control signals for the predetermined unit time;
    if a time difference between points of time where the same remote control signal is received is smaller than a predetermined critical time, neglecting other remote control signals of the received plurality of same remote control signals for the predetermined unit time; and
    if the time difference is larger than the predetermined critical time, controlling to perform the control action corresponding to the other remote control signals of the received plurality of same remote control signals for the predetermined unit time,
    wherein the predetermined unit time starts from a point of time where the first received remote control signal is received.

6. The method of claim 5, wherein the controlling comprises, if the received plurality of same remote control signals is repeatedly received according to a long push manipulation of a repeat key of the remote controller for a plurality of continuous unit times and the time difference is larger than the predetermined critical time, the performing of the control action corresponding to the first received remote control signal is performed and the neglecting includes ignoring the other remote control signals for a first unit time and the performing further includes performing control actions corresponding to each of the other remote control signals for respective remaining unit times.

7. The method of claim 5, wherein the controlling comprises, if the received plurality of same remote control signals is repeatedly received according to a long push manipulation of a repeat key of the remote controller for a plurality of continuous unit times and the time difference is larger than the predetermined critical time, the performing of the control action corresponding to the first received remote control signal is performed and the neglecting includes ignoring the other remote control signals for a first unit time and the performing further includes performing control actions corresponding to at least two remote control signals selected from the other remote control signals for respective remaining unit times.

8. The method of claim 5,
    wherein the predetermined unit time is 300 ms, and
    wherein if the time difference is larger than the predetermined critical time, the received plurality of same remote control signals comprises the first received remote control signal generated according to a manipulation of the remote controller and two same remote control signals generated sequentially at 100 ms intervals following the manipulation of the remote controller.

9. A non-transitory recording medium in which a program for carrying out a signal processing method of a device capable of being controlled by user commands transmitted from a remote controller is stored, the signal processing method comprising:
receiving a plurality of same remote control signals for a predetermined unit time;
controlling to perform a control action corresponding to a first received remote control signal of the received plurality of same remote control signals for the predetermined unit time;
if a time difference between points of time where the same remote control signal is received is a smaller than a predetermined critical time, neglecting other remote control signals of the received plurality of same remote control signals for the predetermined unit time; and
if the time difference is a larger than the predetermined critical time, controlling to perform the control action corresponding to the other remote control signals of the received plurality of same remote control signals for the predetermined unit time,
wherein the predetermined unit time starts from a point of time where the first received remote control signal is received.

10. The medium of claim 9, wherein the controlling comprises: if the received plurality of same remote control signals is repeatedly received according to a long push manipulation of a repeat key of the remote controller for a plurality of continuous unit times and the time difference is larger than the predetermined critical time, the performing of the control action corresponding to the first received remote control signal is performed and the neglecting includes ignoring the other remote control signals for a first unit time and the performing further includes performing control actions corresponding to each of the other remote control signals for respective remaining unit times.

11. A broadcasting apparatus capable of being controlled by user commands transmitted from a remote controller, the apparatus comprising:
an infrared (IR) signal receiving unit configured to receive a plurality of same IR signals transmitted by the remote controller for a predetermined time; and
a control unit configured to perform a control action corresponding to a first received IR signal of the received plurality of same IR signals for the predetermined time;
wherein if a time difference between points of time where the same IR signal is received is smaller than a predetermined critical time, the control unit neglects other IR signals of the received plurality of same IR signals for the predetermined time,
wherein if the time difference is larger than the predetermined critical time, the control unit performs the control action according to the other IR signals of the of the received plurality of same IR signals for the predetermined time, and
wherein the predetermined time starts from a point of time where the first received IR signal is received.

12. The broadcasting apparatus of claim 11, wherein if the received plurality of same IR signals is repeatedly received according to a long push manipulation of a repeat key of the remote controller for a plurality of continuous unit times and the time difference is larger than the predetermined critical time, the control unit performs the control action corresponding to the first received IR signal and ignores the other IR signals for a first unit time and performs control actions corresponding to each of the other IR signals for respective remaining unit times.

13. The broadcasting apparatus of claim 11, wherein if the received plurality of same IR signals is repeatedly received according to a long push manipulation of a repeat key of the remote controller for a plurality of continuous unit times and the time difference is larger than the predetermined critical time, the control unit performs the control action corresponding to the first received IR signal and ignores the other IR signals for a first unit time and performs control actions corresponding to at least two IR signals selected from the other IR signals for respective remaining unit times.

14. The broadcasting apparatus of claim 11,
wherein the predetermined time is 300 ms, and
wherein if the time difference is larger than the predetermined critical time, the received plurality of same IR signals comprises the first received IR signal generated according to a manipulation of the remote controller and two same IR signals generated sequentially at 100 ms intervals following the manipulation of the remote controller.

15. A signal processing method of a broadcasting apparatus capable of being controlled by user commands transmitted from a remote controller, the method comprising:
receiving a plurality of same IR signals transmitted from the remote controller for a predetermined time;
performing a control action corresponding to a first received IR signal of the received plurality of same IR signals for the predetermined time;
if a time difference between points of time where the same IR signal is received is smaller than a predetermined critical time, neglecting other IR signals of the received plurality of same IR signals for the predetermined time; and
if the time difference is larger than the predetermined critical time, performing the control action according to the other IR signals of the received plurality of same IR signals for the predetermined time,
wherein the predetermined time starts from a point of time where the first received IR signal is received.

16. The method of claim 15, wherein the performing comprises, if the received plurality of IR signals is repeatedly received according to a long push manipulation of a repeat key of the remote controller for a plurality of continuous unit times and the time difference is larger than the predetermined critical time, performing a control action corresponding to the first received IR signal and ignoring the other IR signals for a first unit time and performing control actions corresponding to each of the other IR signals for respective remaining unit times.

17. The method of claim 15, wherein the performing comprises, if the received plurality of same IR signals is repeatedly received according to a long push manipulation of a repeat key of the remote controller for a plurality of continuous unit times and the time difference is larger than the predetermined critical time, performing the control action corresponding to the first received IR signal and ignoring the other IR signals for a first unit time and performing control actions corresponding to at least two IR signals selected from the other IR signals for respective remaining unit times.

18. The method of claim 15, wherein the predetermined time is 300 ms, and
wherein if the time difference is larger than the predetermined critical time, the received plurality of same IR signals comprises the first received IR signal generated according to a manipulation of the remote controller and two same IR signals generated sequentially at 100 ms intervals following the manipulation of the remote controller.

19. A non-transitory recording medium in which a program for carrying out a signal processing method of a broadcasting apparatus capable of being controlled by user commands transmitted from a remote controller is stored, the signal processing method comprising:

receiving a plurality of same IR signals transmitted from the remote controller for a predetermined time; and performing a control action corresponding to a first received IR signal of the received plurality of same IR signals for the predetermined time;

if a time difference between points of time where the same IR signal is received is smaller than a predetermined critical time, neglecting other IR signals of the received plurality of same IR signals for the predetermined time; and if the time difference is larger than the predetermined critical time, performing the control action according to the other IR signals of the received plurality of same IR signals for the predetermined time, wherein the predetermined time starts from a point of time where the first received IR signal is received.

* * * * *